United States Patent [19]
Lin et al.

[11] Patent Number: 5,896,956
[45] Date of Patent: Apr. 27, 1999

[54] BICYCLE BRAKE DEVICE

[75] Inventors: Ah-Ping Lin, No. 20, Lane 666, Sec. 2, Chung-Cheng Rd.; Jung-Hua Li, both of Chang-Hua, Taiwan

[73] Assignee: Ah-Ping Lin, Chang-Hua, Taiwan

[21] Appl. No.: 08/851,685

[22] Filed: May 6, 1997

[51] Int. Cl.$^6$ ........................................ B62L 3/00
[52] U.S. Cl. ............................ 188/24.22; 188/24.12
[58] Field of Search ........................ 188/24.22, 24.14, 188/24.15, 24.12, 24.11, 2 D

[56] References Cited

U.S. PATENT DOCUMENTS

| | | | |
|---|---|---|---|
| 4,869,351 | 9/1989 | Romano | 188/24.21 |
| 5,636,716 | 6/1997 | Sugimoto et al. | 188/24.22 |

FOREIGN PATENT DOCUMENTS

| | | | |
|---|---|---|---|
| 882501 | 6/1943 | France | 188/24.12 |
| 1758981 | 10/1922 | United Kingdom | 188/24.12 |

Primary Examiner—Peter M. Poon
Attorney, Agent, or Firm—Fish & Richardson P.C.

[57] ABSTRACT

A bicycle brake device includes opposing first and second brake arms which have respective fixed lower ends and movable upper ends. Two seats support the fixed lower ends. Two brake pads are mounted on the brake arms between the upper and lower ends. A brake cable extends through and engages the upper end of the second brake arm. A directing member directs the brake cable from the upper end of the second brake arm toward the first brake arm. The directing member includes a ring plate which is connected to the upper end of the first brake arm and which has a hole for threading the brake cable therethrough. A simultaneous movement member transmits the movement of the first brake arm to the second brake arm, thereby evenly pressing a rim of a bicycle wheel during a braking operation.

13 Claims, 5 Drawing Sheets

BICYCLE BRAKE DEVICE

BACKGROUND OF THE INVENTION

1. Field of the Invention

This invention relates to a bicycle brake device, more particularly to a bicycle brake device with two opposing brake arms which can be moved simultaneously to prevent a one-sided braking action.

2. Description of the Related Art

Referring to FIG. 1, a conventional bicycle brake device 10 is shown to comprise a pair of brake arms 11, 12 which are formed with a respective hole 111, 121 for mounting a brake pad 13, 14 thereon. A pair of spring seats 15, 16 are provided respectively adjacent the lower ends of the brake arms 11, 12 for mounting torsion springs (not shown) thereon, and are mountable on a forked portion of a bicycle frame (not shown). The brake arm 11 is connected pivotally to a hanger device 20 which engages a brake cable 21. The brake cable 21 interconnects the brake arm 12 and a brake handle of the bicycle (not shown). As such, when the user operates the brake handle to pull the brake cable 21, the brake arm 12 is first moved inward and the brake pad 14 first abuts against the rim of a wheel (not shown) of the bicycle. The brake arm 11 is subsequently then moved inward via movement of the hanger device 20 which is not synchronous with the movement of the brake arm 12.

The non-synchronous forces applied by the brake arms 11, 12 to the rim of the wheel usually results in more severe wearing at one of the brake pads 13, 14 or at one side of the wheel. To solve this problem, the spring seats 15, 16 are usually adjusted by using tools to equalize the braking actions of the brake pads 13, 14. The adjust task as such is inconvenient to conduct.

SUMMARY OF THE INVENTION

The main object of the present invention is to provide a bicycle brake device with two opposing brake arms which can be moved simultaneously, thereby evenly pressing a rim of a bicycle wheel and eliminating the one-sided braking problem commonly encountered in the prior art.

According to this invention, a bicycle brake device includes opposing first and second brake arms which have respective fixed lower ends and movable upper ends. Two seats support the fixed lower ends. Two brake pads are mounted on the brake arms between the upper and lower ends. A brake cable extends through and engages the upper end of the second brake arm. A directing member directs the brake cable from the upper end of the second brake arm toward the first brake arm. The directing member includes a ring plate which is connected to the upper end of the first brake arm and which has a hole for threading the brake cable therethrough. A simultaneous movement member has a transmission unit for transmitting the movement of the first brake arm to the second brake arm. The transmission unit has a support which is fixedly connected to one of the seats adjacent to the first brake arm, and a swing lever which is pivoted to the support and which is connected to the first brake arm. The swing lever is turnable outward to actuate the second brake arm to move inward when the first brake arm is moved inward. A connecting rod interconnects the swing lever and the upper end of the second brake arm for pulling the upper end of the second brake arm inward, thereby moving the brake arms simultaneously. The brake device further includes means for retarding inward movement of the second brake arm before the first brake arm is moved inward.

BRIEF DESCRIPTION OF THE DRAWINGS

Other features and advantages of the present invention will become apparent in the following detailed description of a preferred embodiment of the invention, with reference to the accompanying drawings, in which.

DETAILED DESCRIPTION OF THE PREFERRED EMBODIMENT

Figure 1:
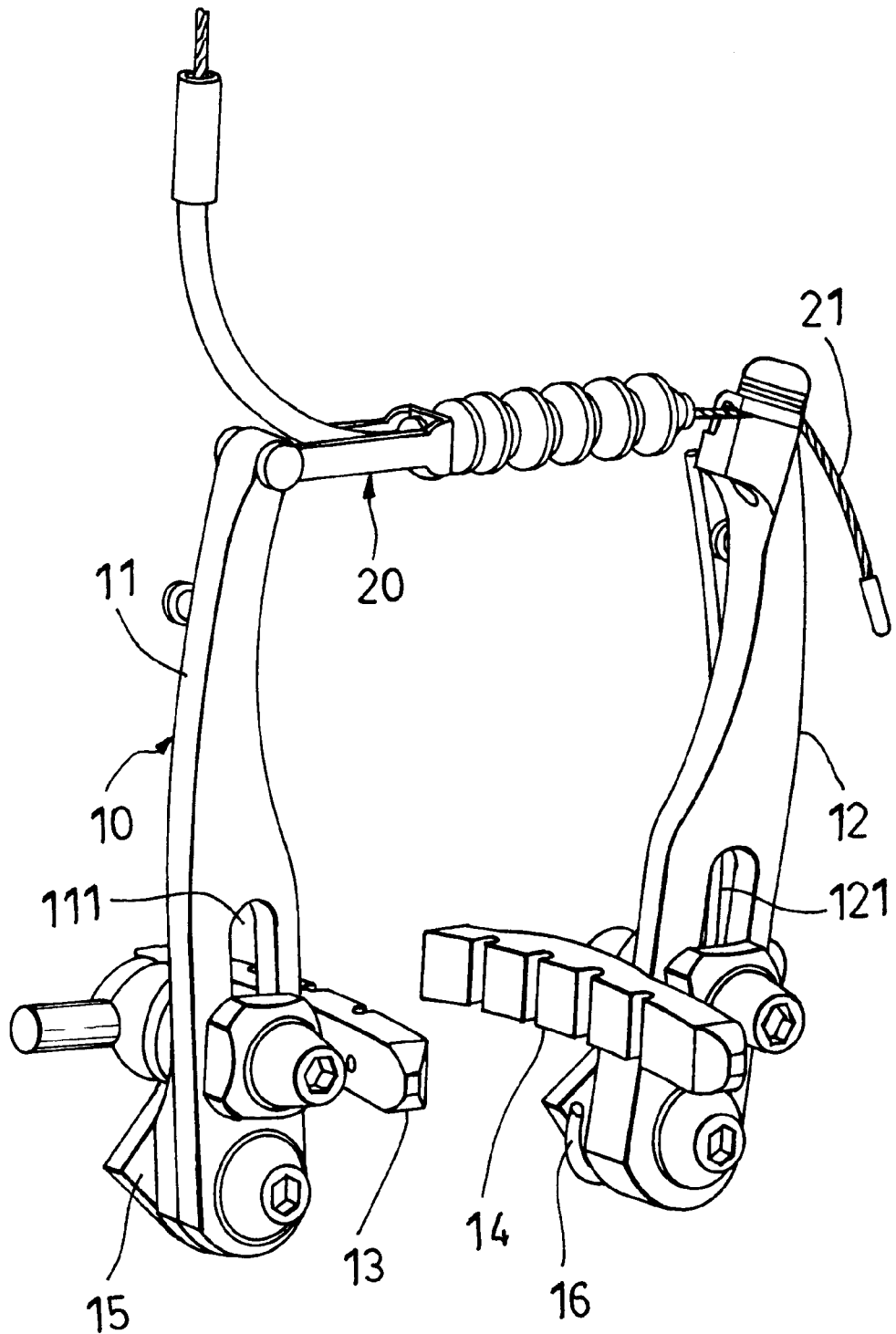
FIG. 1 is a perspective view of a conventional bicycle brake device.
Figure 2:
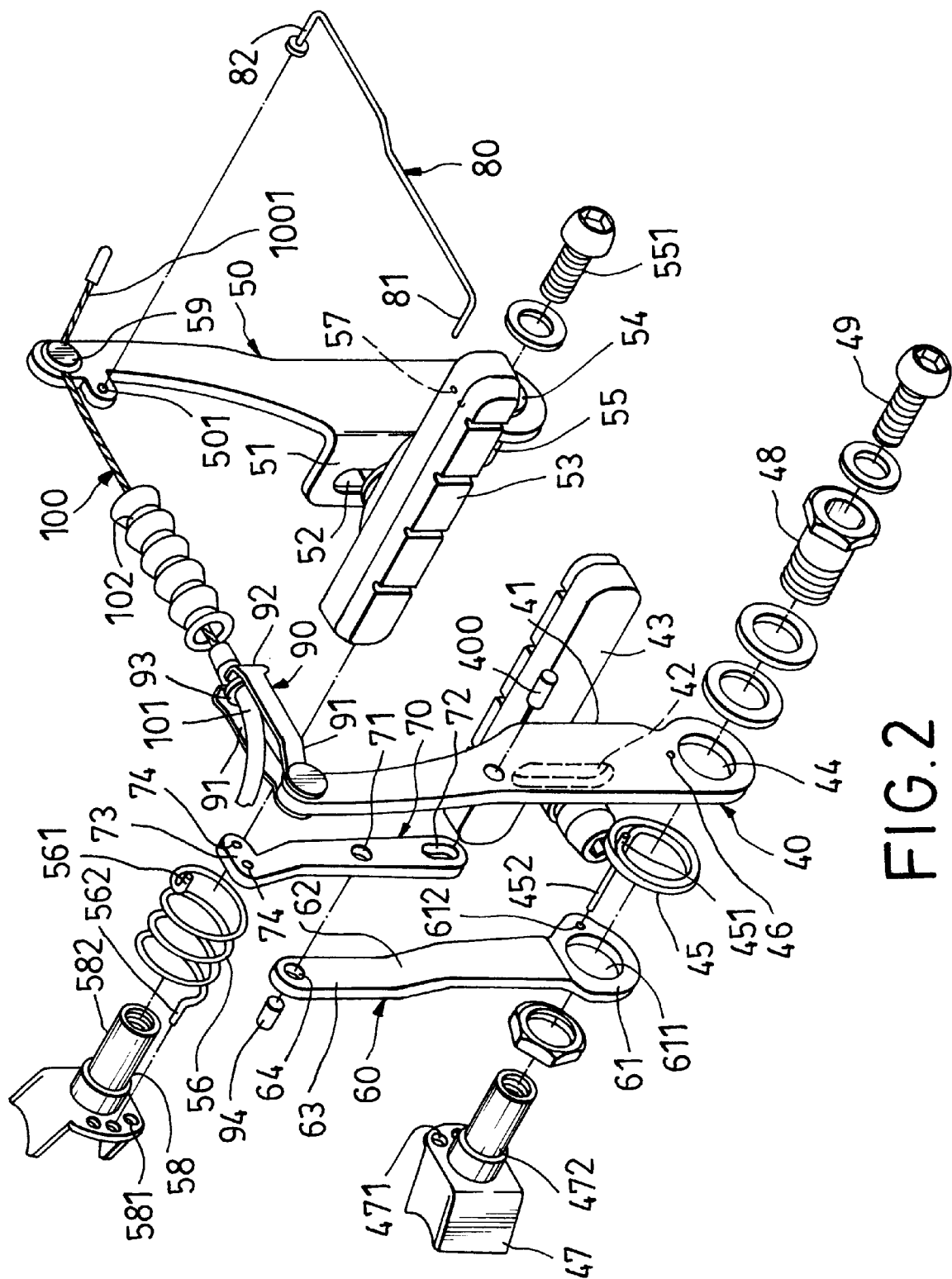
FIG. 2 is an exploded view of a bicycle brake device according to a preferred embodiment of the present invention.

Referring to FIG. 2, the preferred embodiment of a bicycle brake device according to the present invention is shown to comprise opposing first and second brake arms 40, 50, a support plate 60, a swing lever 70, and a connecting rod 80. The first and second brake arms 40, 50 have a respective inner extending plate 41, 51. Each extending plate 41, 51 is formed with an elongate hole 42, 52 for mounting a brake pad 43, 53 thereon.

The first brake arm 40 has a lower end which is formed with a through hole 44 and an insert hole 46. The support plate 60 has a lock hole 611 and a through hole 612 in a lower end 61 thereof. A first brake seat 47 is formed with an internally threaded protrusion 472 and a plurality of adjusting holes 471. A first torsion spring 45 has one end 451 which is inserted into the insert hole 46, and an opposite end 452 which passes through the through hole 612 and which is inserted into a selected one of the adjusting holes 471 so as to position the first torsion spring 45 between the first brake arm 40 and the support plate 60. A hollow screw member 48 penetrates the through hole 44, the first torsion spring 45 and the lock hole 611, and is sleeved on the threaded protrusion 472. A lock screw 49 is threaded into the threaded protrusion 472 so as to fix the lower end of the first brake arm 40 and the support plate 60 on the first brake seat 47. Note that, while the first brake arm 40 is turnable about the hollow screw member 48, the support plate 60 is not turnable because the end 452 of the spring 45 passes through the through hole 612. A hanging device 90 has two clamp plates 91 and a ring plate 92 between the clamp plates 91. The ring plate 92 has a hole 93 for threading a brake cable 100 therethrough.

The construction of the second brake arm 50 is similar to the first brake arm 40. The second brake arm 50 has a lower end which is formed with a through hole 54. A second torsion spring 56 has two ends 561, 562 which are inserted into an insert hole 57 in the lower end of the second brake arm 50 and a selected one of the adjusting holes 581 in a second brake seat 58, respectively. The second brake seat 58 has an internally threaded protrusion 582. The threaded protrusion 582 penetrates the second torsion spring 56 and is inserted into a hollow screw member 55 which is mounted in the through hole 54. A lock screw 551 is threaded into the threaded protrusion 582 so as to fix the lower end of the second brake arm 50 on the second brake seat 58. An insert hole 501 is formed in an upper end of the second brake arm 50.

The lower end 61 of the support plate 60 is slightly bent backward to confine a space with the lower end of the first brake arm 40 for receiving the first torsion spring 45. The support plate 60 has a medial portion 62 which abuts against the first brake arm 40, and an upper end 63 which is bent backward and which is formed with a pivot hole 64.

The swing lever 70 has a lower lever end formed with an oblong hole 72 for pivotal connection with the first brake arm 40 via a pin 400, an upper lever end 73 with a plurality of insert holes 74, and a medial portion with a pivot hole 71.

The connecting rod 80 has a first end 81 and a second end 82 which is formed with a head.

Figure 3:
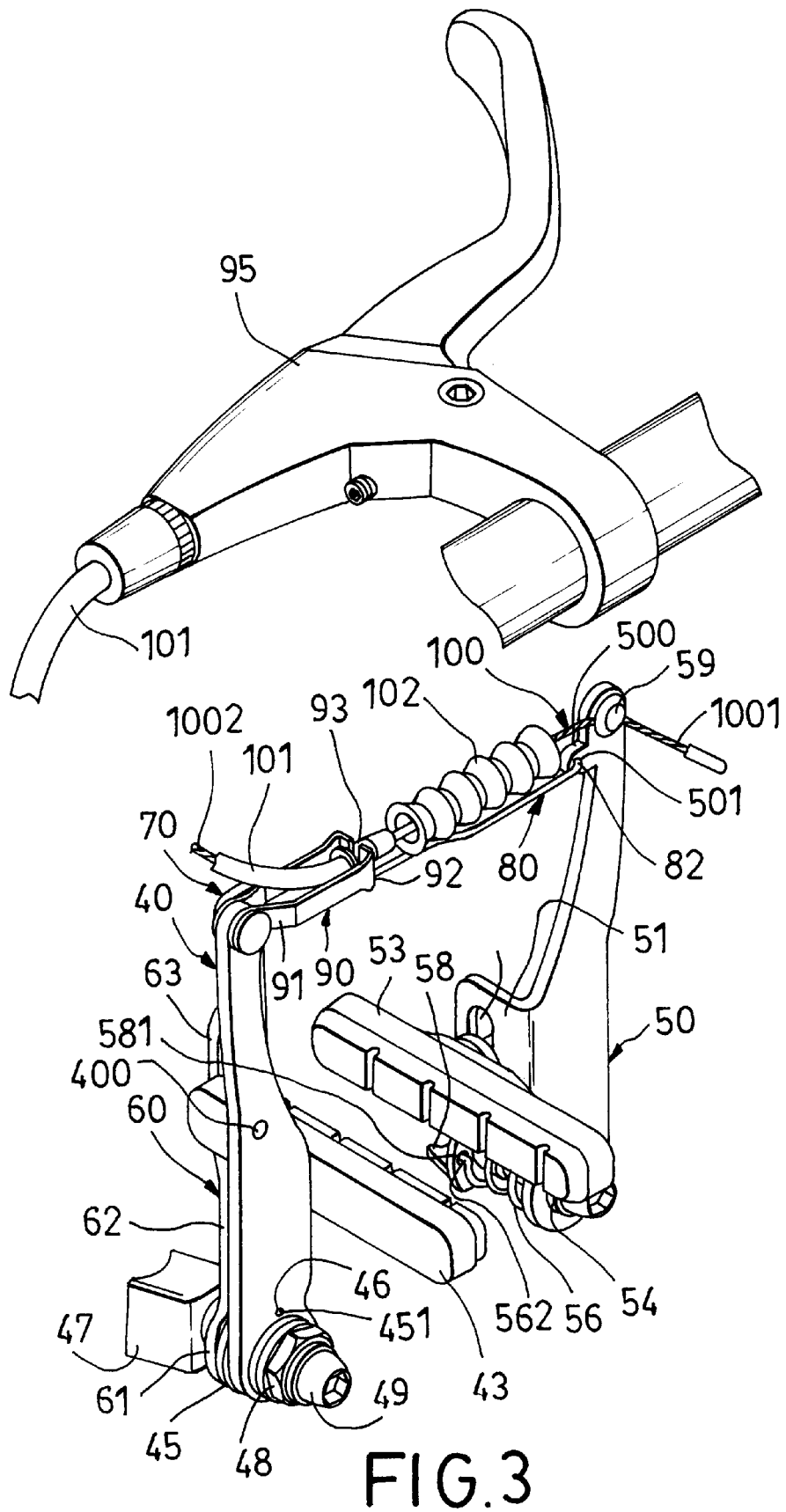
FIG. 3 is a perspective view of the embodiment of FIG. 2.

In assembly, with reference to FIG. 3, the two brake pads 43, 53 are mounted in the elongate holes 42, 52, respectively. A pivot pin 94 passes through the pivot holes 71, 64 to pivot the swing lever 70 to the upper end of the support plate 60. The pin 400 passes through the first brake arm 40 and the oblong hole 71. The cover sleeve 102 and the tube 101 are sleeved on the brake cable 100. A portion 1001 of the cable 100 is locked by a bolt 59 to the upper end of the second brake arm 50. The tube 101 engages the hole 93 of the ring plate 92. A portion 1002 of the cable 100 is connected to the brake handle 95. The two ends 81, 82 of the connecting rod 80 are inserted into the insert holes 74, 501.

Figure 4:
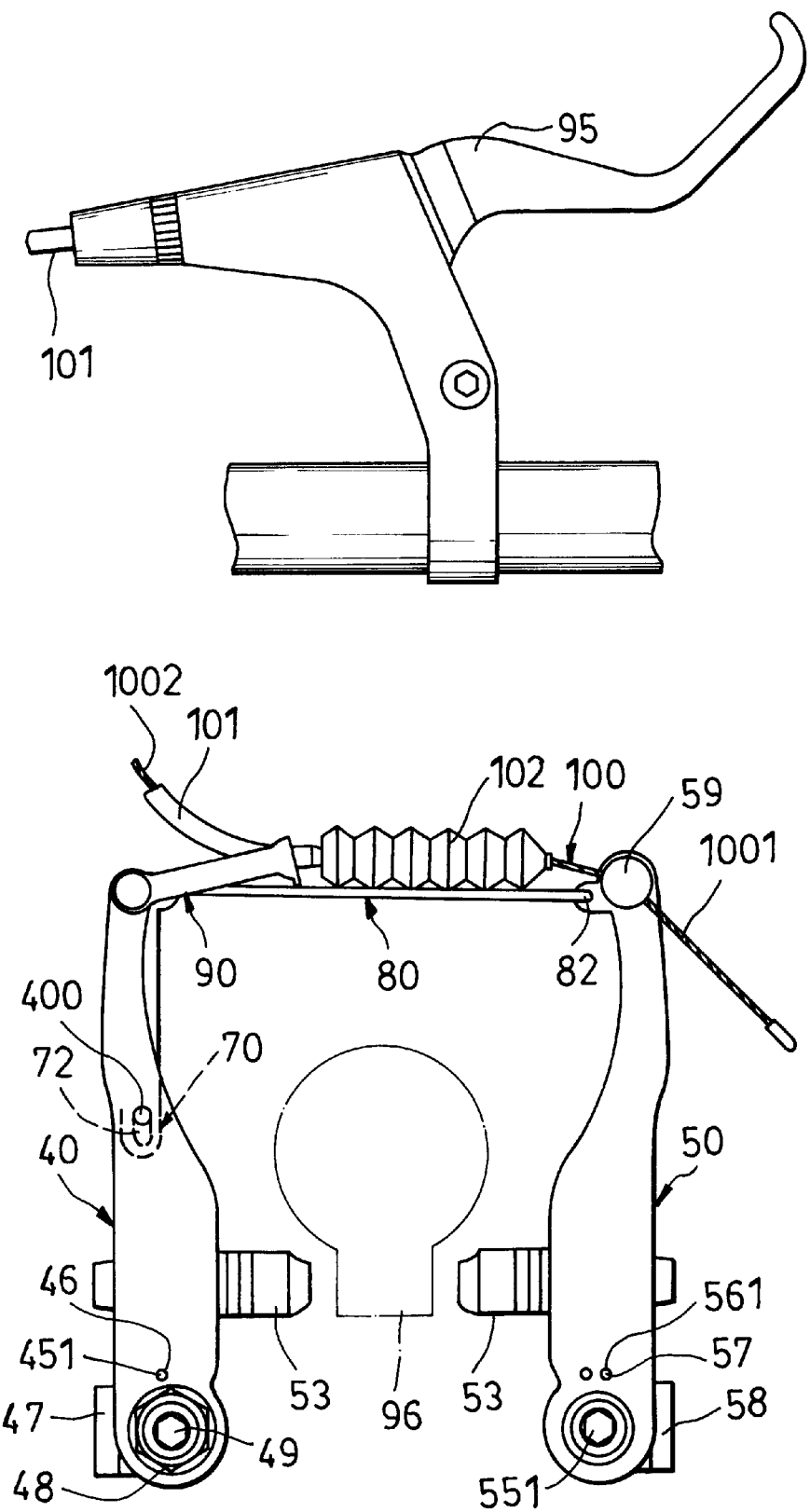
FIG. 4 is a schematic view of the bicycle brake device before a braking operation.
Figure 5:
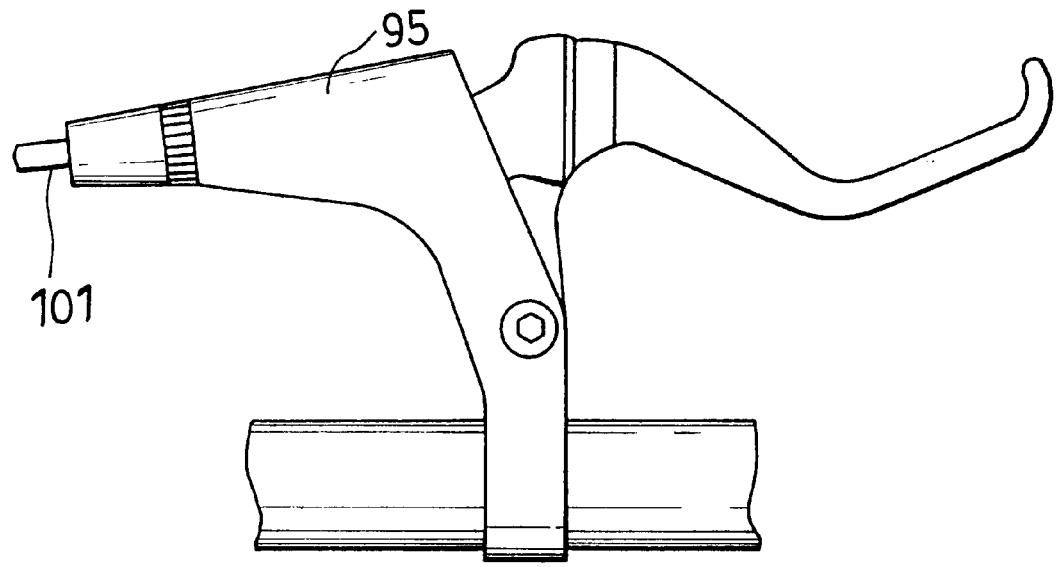
FIG. 5 is a schematic of the bicycle brake device after a braking operation.
Figure 5:
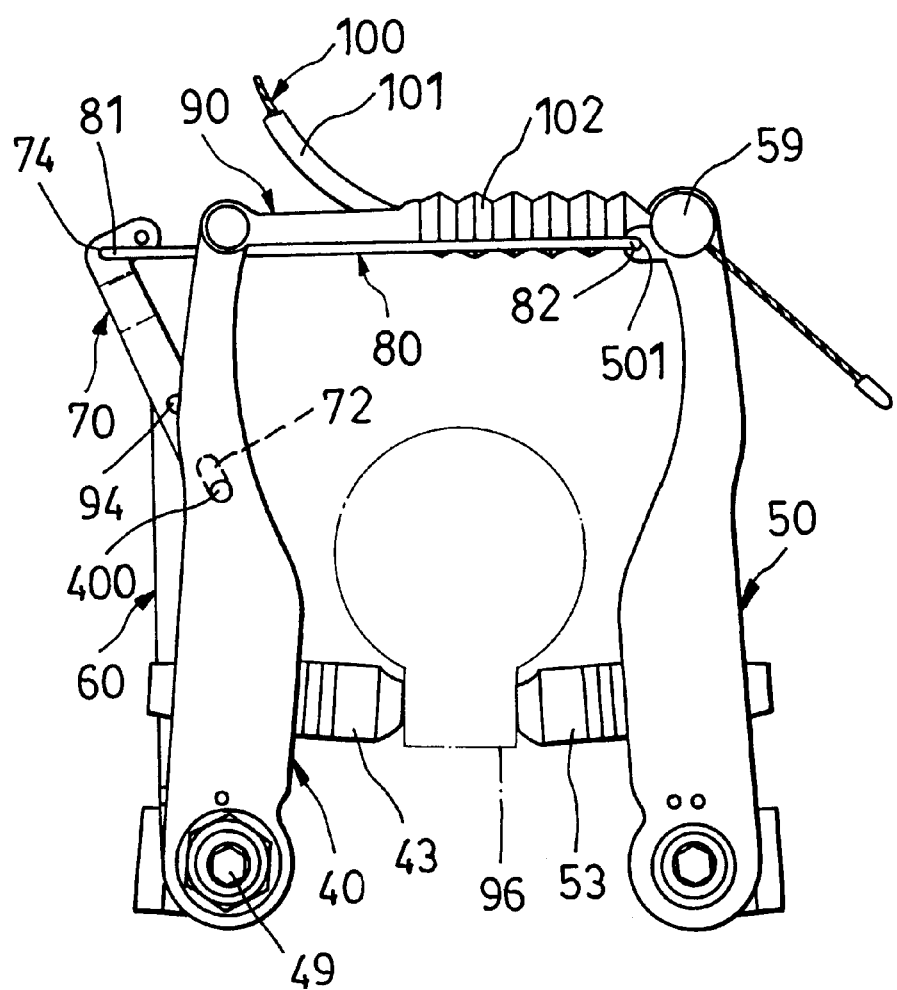

Referring to FIGS. 4 and 5, before a braking operation of the bicycle brake device, the pin 400 is in the upper end of the oblong hole 72. Note that the second torsion spring 56 in this embodiment is arranged such that it produces a spring force which is greater than that of the first torsion spring 45 so as to retard inward movement of the second brake arm 50 before the first arm 40 is moved inward or the ring plate 93 is actuated. When the brake cable 100 is pulled upward via the handle 95, the ring plate 93 will be moved toward the second brake arm 50 so as to move the first brake arm 40 inward. Because the support plate 60 is immobile, and because the mediate portion of the swing lever 70 is pivoted to the upper end of the support plate 60, when the first brake arm 40 is moved inward, the lower lever end of swing lever 70 is simultaneously moved inward so that the upper lever end 73 is moved outward until the pin 400 is in the lower end of the oblong hole 72. The connecting rod 80 is thus moved inward by the swing lever 70, thereby moving the upper end of the second brake arm 50 inward. As such, the brake arms 40, 50 are simultaneously moved inward so as to be enable the brake pads 43, 53 to contact a wheel of the bicycle simultaneously, thereby balancing the actions of the brake pads 43, 53 and preventing the one-sided braking action commonly occurring in the prior art.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A bicycle brake device comprising:
   opposing first and second brake arms having respective fixed lower ends and movable upper ends which are movable inward in a braking position;
   seats for supporting said fixed lower ends, respectively;
   a pair of brake pads mounted on said first and second brake arms, respectively, between said movable upper and fixed lower ends;
   a brake cable extending through and engaging said movable upper end of said second brake arm;
   means for directing said brake cable from said movable upper end of said second brake arm toward said movable upper end of said first brake arm, said means including a ring plate which is connected to said movable upper end of said first brake arm and which has a hole for threading said brake cable therethrough; and
   means for simultaneously moving said first and second brake arms inward, said moving means including a transmission means for transmitting the movement of said first brake arm to said second brake arm, wherein said transmission means comprises:
      a support fixedly connected to one of said seats adjacent to said first brake arm;
      a swing lever pivoted to said support and connected to said first brake arm, said swing lever being turnable outward to actuate said second brake arm to move inward when said first brake arm is moved inward; and
      a connecting rod which interconnects said swing lever and said movable upper end of said second brake arm for pulling said movable upper end of said second brake arm inward.

2. A bicycle brake device according to claim 1, wherein said swing lever has a lower lever end which is pivoted to said first brake arm, an upper lever end connected to said second brake arm, and a medial portion between said lower and upper lever ends, said medial portion being pivoted to said support.

3. A bicycle brake device according to claim 2, further comprising first and second spring means for biasing said first and second brake arms outward, said second spring means having a spring force greater than that of said first spring means, thereby retarding said second brake arm from moving inward before said first brake arm is moved inward.

4. A bicycle brake device according to claim 2, wherein said support includes a support plate which has a lower end fixed to said one of said seats and an upper end fixedly connected to said medial portion, said support late extending upward from said one of said seats.

5. A bicycle brake device according to claim 2, wherein said connecting rod has two opposite ends respectively pivoted to said movable upper end of said second brake arm and said upper lever end of said swing lever.

6. A bicycle brake device according to claim 2, wherein said lower lever end has an oblong hole for pivot connection with said first brake arm.

7. A bicycle brake device comprising:
   opposing first and second brake arms having respective fixed lower ends and movable upper ends which are movable inward in a braking position;
   seats for supporting said fixed lower ends, respectively;
   a pair of brake pads mounted on said first and second brake arms, respectively, between said movable upper and fixed lower ends;
   a brake cable extending through and engaging said movable upper end of said second brake arm;
   means for directing said brake cable from said movable upper end of said second brake arm toward said movable upper end of said first brake arm, said means including a ring plate which is connected to said movable upper end of said first brake arm and which has a hole for threading said brake cable therethrough; and
   means for simultaneously moving said first and second brake arms inward, said means including a transmission means for transmitting the movement of said first brake arm to said second brake arm, wherein said means for simultaneously moving said first and second brake arms further includes means for retarding inward movement of said second brake arm before said first brake arm is moved inward.

8. A bicycle brake device according to claim 7, wherein said transmission means comprises:

a support fixedly connected to one of said seats adjacent to said first brake arm;

a swing lever pivoted to said support and connected to said first brake arm, said swing lever being turnable outward to actuate said second brake arm to move inward when said first brake arm is moved inward; and a connecting rod which interconnects said swing lever and said movable upper end of said second brake arm for pulling said movable upper end of said second brake arm inward.

9. A bicycle brake device according to claim 8, wherein said swing lever has a lower lever end which is pivoted to said first brake arm, an upper lever end connected to said second brake arm, and a medial portion between said lower and upper lever ends, said medial portion being pivoted to said support.

10. A bicycle brake device according to claim 9, further comprising first and second spring means for biasing said first and second brake arms outward, said second spring means having a spring force greater than that of said first spring means, thereby retarding said second brake arm from moving inward before said first brake arm is moved inward.

11. A bicycle brake device according to claim 9, wherein said support includes a support plate which has a lower end fixed to said one of said seats and an upper end fixedly connected to said medial portion, said support plate extending upward from said one of said seats.

12. A bicycle brake device according to claim 9, wherein said connecting rod has two opposite ends respectively pivoted to said movable upper end of said second brake arm and said upper lever end of said swing lever.

13. A bicycle brake device according to claim 9, wherein said lower lever end has an oblong hole for pivot connection with said first brake arm.

* * * * *